(No Model.)  
4 Sheets—Sheet 1.

T. P. KINSEY.
MASHING TUB MACHINERY.

No. 267,225. Patented Nov. 7, 1882.

Witnesses:  
Samuel T. P. Kinsey  
Frank O. Kinsey

Inventor:  
Thomas P. Kinsey (No Model.)  4 Sheets—Sheet 2.

T. P. KINSEY.
MASHING TUB MACHINERY.

No. 267,225. Patented Nov. 7, 1882.

Witnesses:
Samuel P. Kinsey
Frank P. Kinsey

Inventor:
Thomas P. Kinsey (No Model.)

T. P. KINSEY.
MASHING TUB MACHINERY.

No. 267,225.

Patented Nov. 7, 1882.

(No Model.)

T. P. KINSEY.

MASHING TUB MACHINERY.

No. 267,225.

Patented Nov. 7, 1882.

4 Sheets—Sheet 4.

Witnesses:
Samuel P. Kinsey.
Frank P. Kinsey.

Inventor:
Thomas P. Kinsey

UNITED STATES PATENT OFFICE.

THOMAS P. KINSEY, OF READING, PENNSYLVANIA, ASSIGNOR OF ONE-HALF TO JOHN G. KALBACH, OF SAME PLACE.

MASHING-TUB MACHINERY.

SPECIFICATION forming part of Letters Patent No. 267,225, dated November 7, 1882.

Application filed March 22, 1882. (No model.)

*To all whom it may concern:*

Be it known that I, THOMAS P. KINSEY, of the city of Reading, county of Berks, State of Pennsylvania, have invented a new and useful Improvement in Mashing-Tub Machinery, of which the following is a specification.

This improvement relates more particularly to that class of mashing-tubs adapted by a fixed gear to drive a series of satellite-shafts with beaters.

Figure 1:
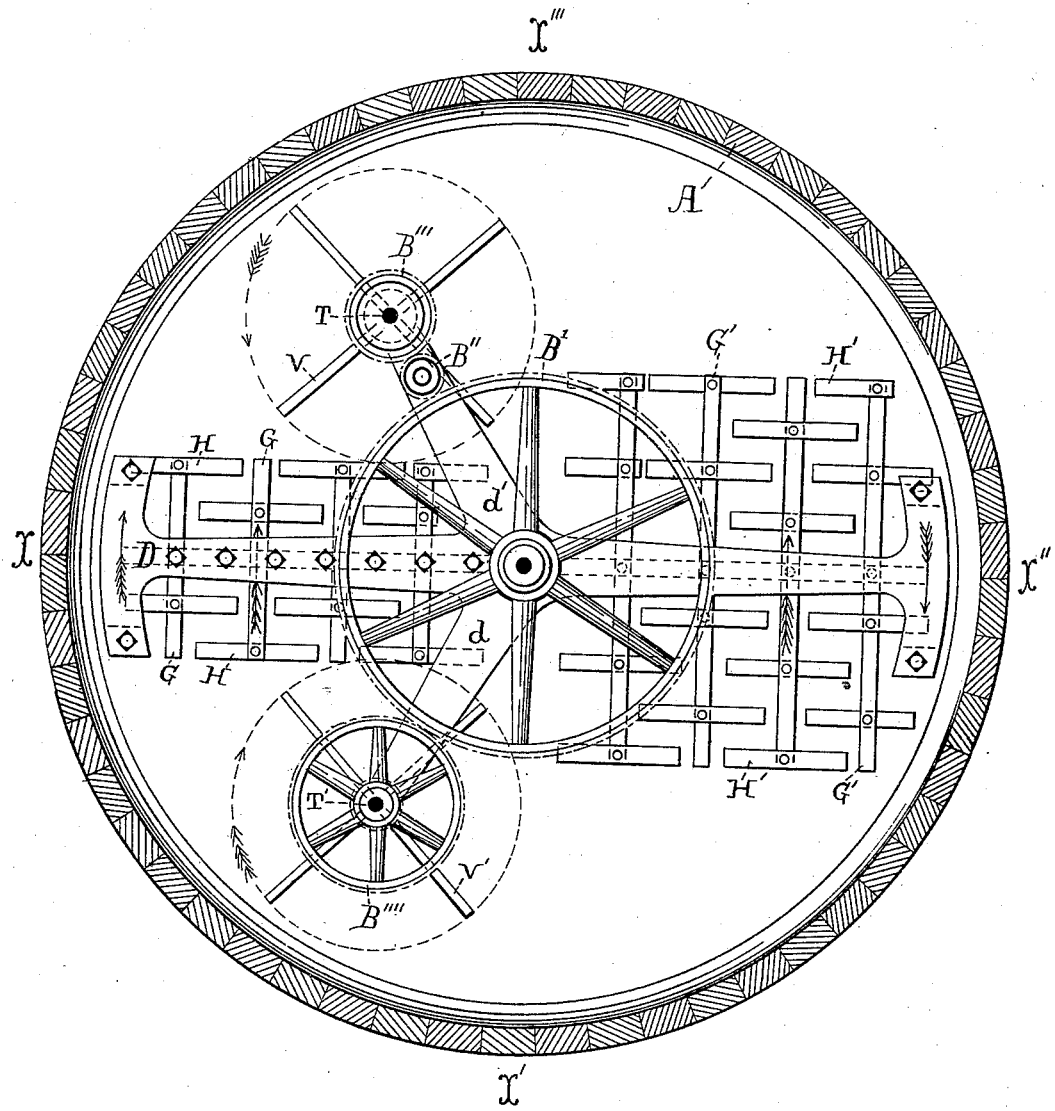
Figure 2:
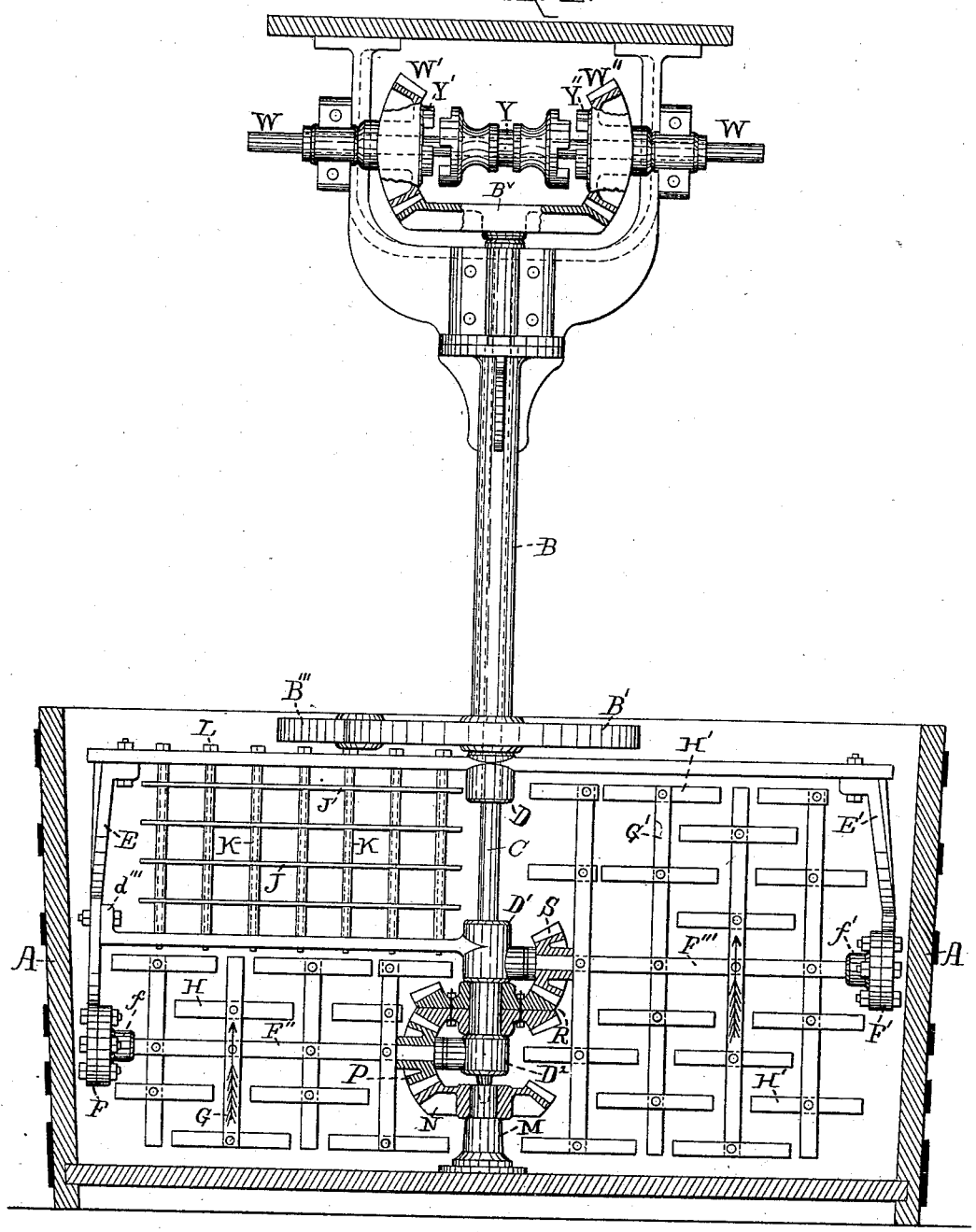
Figure 3:
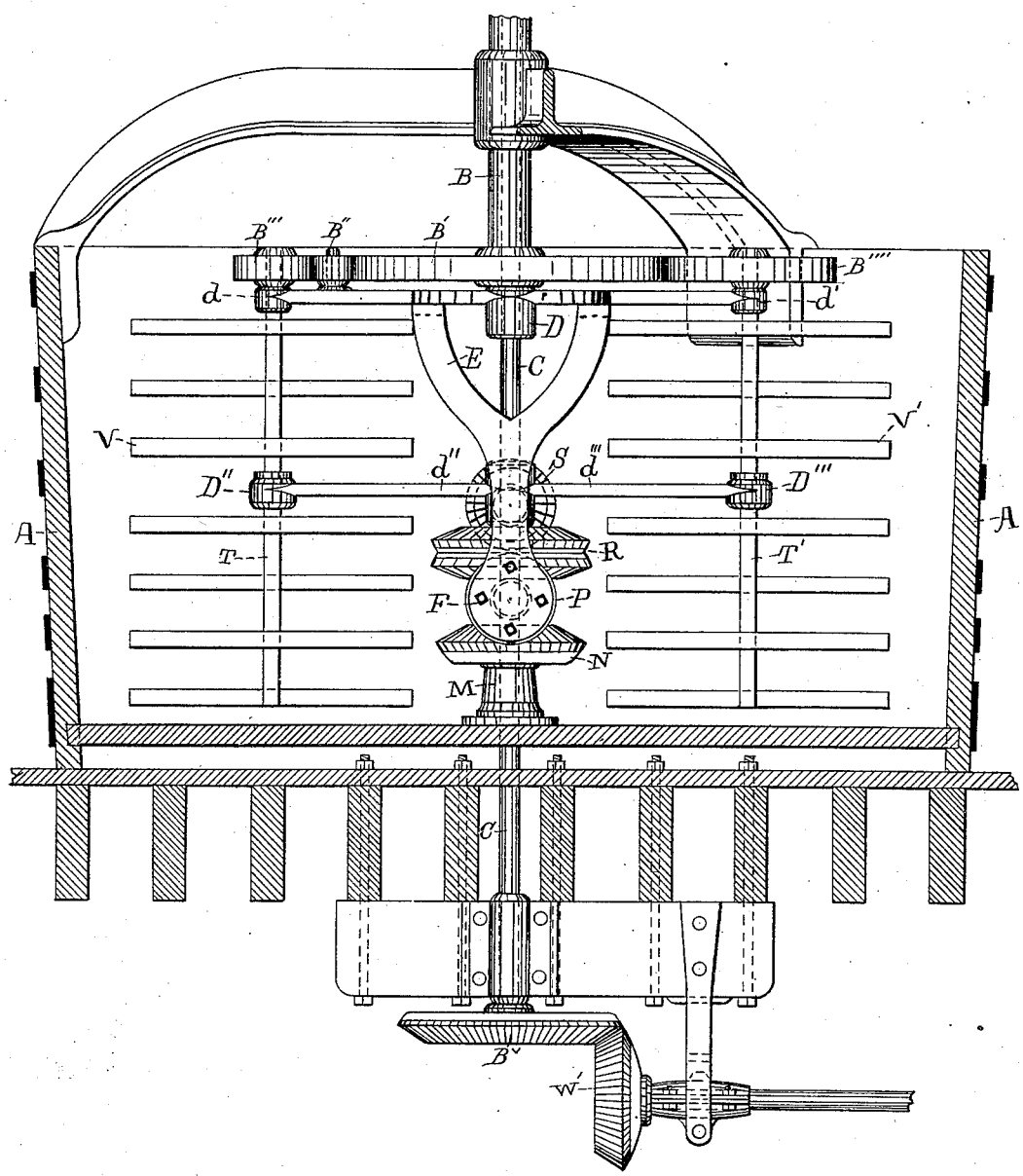
Figure 4:
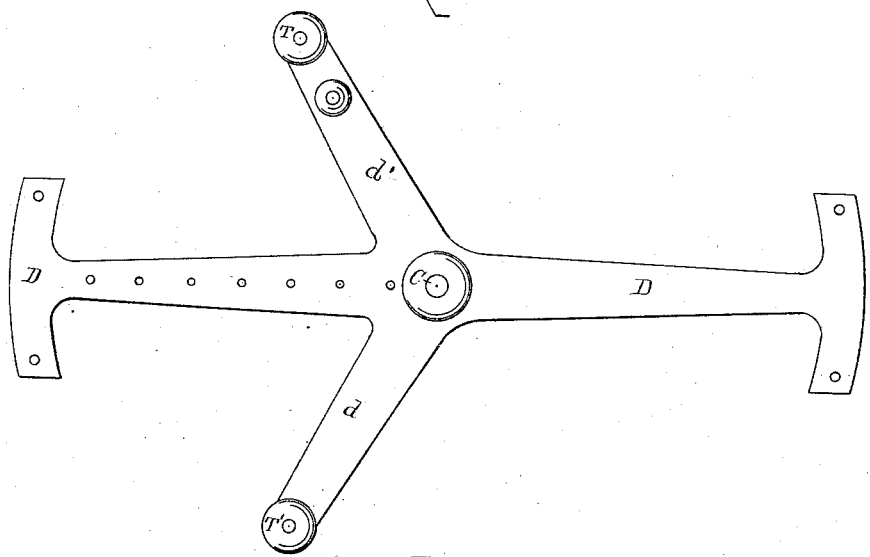
Figure 5:
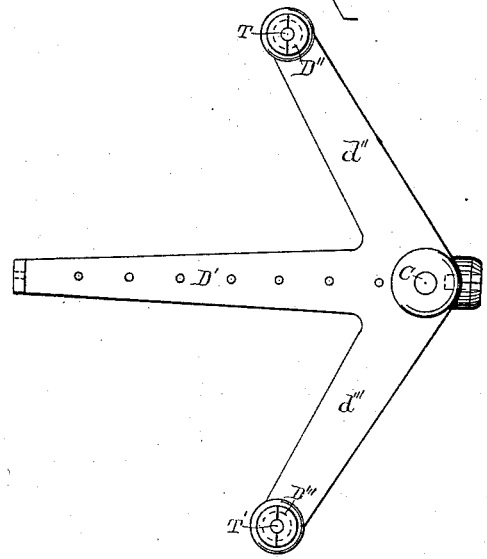

Referring to the drawings, in which similar letters of reference indicate similar parts, Figure 1, Sheet 1, is a general plan, showing the arrangement of the gearing, the arrows indicating the motions of the several shafts. Fig. 2, Sheet 2, is a section of the tub at $x\ x''$ and an elevation of the machinery, partly in section, as seen from the point $x'$ in the plan, the vertical shaft T' being removed, so as to exhibit both of the horizontal shafts, with their arms and beaters, and the agitator. Fig. 3, Sheet 3, represents a section of the tub at $x'\ x'''$ and an elevation of the machinery as seen from the point $x$ on the plan, and exhibits the pendent hanger E, which supports the outer end of the horizontal shaft F'' and the two vertical beater-shafts T T', with their arms V V' and boxes D'' D''', (for bearings in angular spider D',) and shows also a modification of the motive gearing. Fig. 4, Sheet 4, represents a plan of the four-armed spider. Fig. 5, Sheet 4, represents a plan of the triple-armed spider, showing boxes D'' D''' fitted in the bosses of arms $d^2\ d^3$.

A represents the tub, which is of the usual construction. B is a hollow pendant, secured permanently to the overhead gear-hanger. Where the machinery is driven from an overhead shaft, and where the machinery is driven from beneath the tub, the hollow pendant is secured in the hub of a spider straddling the top edge of the tub. In either case it has affixed to its lower end a spur-gear wheel, B'. The driving-shaft C receives its motion through a double set of bevels, W' W'', on the main shaft W, and have upon their inner disk-faces clutch-lugs Y' Y''. A sliding clutch, Y, working upon a feather in the main shaft, is provided with disks and lugs of corresponding form. By this means the driving-shaft C, with the arms D D' and hub D'''', can be driven in either a right or left circuit of the tub. D is the upper arm or spider, secured to the shaft C below the gear-wheel B', and is provided with two angular arms, $d\ d'$. The main arm D has at each end a sector-formed head, to which the hangers E E' for the horizontal shafts are secured. The arms $d\ d'$ have bosses at their extremities, which are bored to fit the upper journals of the shafts T T', and the arm $d$ has an additional boss, in which is secured the shaft or bearing for the counter-wheel B''. The lower spider, D', is three-armed, the main arm secured to the pendant E at its outer end, and having angular arms $d''\ d'''$, with bosses at their outer ends, corresponding between centers with $d\ d'$ on the upper spider, D. These bosses are bored for bearing-boxes D'' D''', which are bored internally to suit the journals of the shafts T T' and turned externally to fit the bore of the bosses. The boxes are bisected vertically. The shafts T T' are square, and this arrangement of boxes provides for the passage of the shaft through the bosses, the boxes being placed on the shaft preparatory to erection and dropped together into the boss.

E and E' are pendants secured to the sector ends of the upper spider, D, and have heads F F', to which the bearing-boxes $f\ f'$ of the horizontal shafts F'' F''' are bolted. F'' F''' are square wrought-iron shafts, the shaft F''' having its outer bearing in box $f'$ and its inner bearing in a boss provided for it on the hub of the lower spider, D', and is driven by the bevel-pinion S from the double-faced counter bevel-wheel R, while the shaft F'', also of square wrought-iron, has its outer bearing in box $f$ and its inner bearing in a boss on the counter-wheel bearing hub $D^2$, and derives its motion from the fixed bevel-wheel N through the bevel-pinion P in gear with the same.

G and G' are flat wrought-iron arms bolted to the shafts F'' F''', and H H' are flat wrought-iron beaters bolted to the arms.

J J are flat iron agitators, perforated to correspond with holes drilled or cored in the main arms of the upper and lower spiders, D D', and K K are thimbles or distance-pieces of tubing separating the horizontal beaters. L L are bolts or pins dropped through the upper spider-arm, thimbles, and horizontal beaters, and lower arm, D', terminating flush with the lower face thereon. A change in the length of the thimbles K will produce a fine or coarse screen, as may be desired, for the material operated upon.

M is a pillar secured to the bottom of the tub, and is counterbored for a step when the machinery is driven from overhead; but when the machinery is driven from below the tub the pillar is then bored through for the shaft C to pass freely through the same. The space between the hub $D^2$ and the top of the pillar being filled out with a collar prevents any leakage through the same. The pillar in either case has keyed to its top a fixed bevel-wheel, N, from which the motion of the shafts F'' F''' upon their own axes is derived.

P is the bevel-pinion for driving shaft F'', and at the same time transmitting motion to the double-faced counter bevel-wheel R. This wheel may be cast as two separate wheels and bolted together, or may be cast solid. It is bored to run loosely upon the hub $D^2$, and serves to give motion to the shaft F''' through the bevel-pinion S.

Following up the movement of the machinery in operation, it will be seen that, assuming the shaft C to be driven in the direction of the sun, the pinion P in gear with the fixed bevel-wheel N will have a corresponding motion upon its axis, while the counter-bevel, R, will have a reverse sun movement, and will transmit the same to the pinion S and shaft F'''. At the same time the vertical shaft T, with its spur-wheel B''' and counter spur-pinion B'', has also a reverse sun movement given it by the travel of the counter-pinion B'' around the fixed spur-wheel B'. The shaft T', being geared direct with the fixed wheel B', through its spur-wheel B'''', has a sun movement given to it. From this it is plain that while the shafts are carried by the spiders around the tub, and would, were they without a motion of their own upon their axes, generate a current in the mash in the same direction; that, geared as they are in direct opposition, a current cannot be maintained, but instead a continual agitation of the mash, still further enhanced by the action of the screen-beater J K.

I am aware that horizontal and vertical beater-shafts for mash-tubs are not new, and that pivoted and flexible screens have been used for mash-tubs and washing apparatus, and do not broadly claim the same. See Patent No. 25,329, September 6, 1859, E. Heckel, improved apparatus for mashing; also, No. 171,832, January 4, 1876, Thomas A. McIntyre, mashing-machines; also, No. 228,177, June 1, 1880, William Craig, mash-machines; *Der Praktische Maschinen-Constructeur* for 1872, (Leipsic,) page 116, Fig. 193, brewers' mash-tubs, and G. W. Day, No. 127,856, June 11, 1872, gas-purifiers. An examination of the movements of the cited patents will show that the revolving satellite-shafts rotate on their several axes in the same direction as the resulting current induced by the motion of the main driving-shaft, whereas in my improvement the current is continually broken up by the counter action of the beater and screen movements.

What I claim, and desire to secure by Letters Patent, is as follows, to wit:

1. The spider D, consisting of two main arms and two auxiliary arms, $d\ d'$, the former being provided at their outer ends with hangers E E' and agitating-screen J K, and the latter being provided at their outer ends with vertical shafts T T', in combination with the shaft C and spur-wheels $B'\ B^2\ B^3\ B^4$, substantially as shown, and for the purpose set forth.

2. The spider D', consisting of one main arm and two auxiliary arms, $d^2\ d^3$, the former provided at its outer end with a flange to connect with the hanger E and at its inner end with a bearing for the shaft F''', and the latter provided at their outer ends with vertical shafts T T' and bearing-boxes D'' D''' for the same, in combination with the spider D, dependent hangers E E, shafts C, F'', and F''', bevel-wheels S R P, and fixed bevel-wheel N, substantially as shown, and for the purpose described.

3. The agitator-rack or screen-beater J K, formed of horizontal bars J, tubular distance-pieces K, and rods or bolts L, in combination with the main arms of the spiders D D', whereby, by substituting pieces of greater or shorter length for the tubular pieces K, the screen may be made finer or coarser without disturbing the positions of the spiders D D' upon the shaft C, substantially as shown, described, and for the purpose specified.

4. The spiders D and D', in combination with the shaft C, rack or screen beater J K, pendent hangers E E', shafts T T' and F'' F''', spur-gears $B'\ B^2\ B^3\ B^4$, and bevel-gears S R P N, for the purpose described, and substantially as shown.

5. In a mashing-tub apparatus, the suspension of the horizontal beater-shaft $F^2$ at its outboard end in a bearing, $f$, attached to hanger E and its inner end in a bearing provided upon the counter-hub $D^2$, in combination with the spiders D D', wheels P R S, fixed wheel N, and shaft C, substantially as described, and for the purpose set forth.

6. In a mashing-tub apparatus, as described, the suspension of the horizontal beater-shaft $F^3$ at its outboard end in a bearing, $f'$, attached to hanger E', and its inner end in a bearing provided for the same upon the hub of the spider D', in combination with the spiders D D', wheels S R P, and fixed wheel N, substantially as shown, and for the purpose set forth.

THOMAS P. KINSEY.

Witnesses:
F. PIERCE HUMMEL,
GARRETT B. STEVENS.